(12) United States Patent
Nell

(10) Patent No.: US 6,296,888 B1
(45) Date of Patent: Oct. 2, 2001

(54) METHOD FOR THE EXTRACTION OF VEGETABLE JUICES FROM VEGETABLE RESIDUE AND/OR FROM VEGETABLE REMNANTS RESIDUE

(75) Inventor: Pieter C. Nell, Ursum (NL)

(73) Assignee: Provalor B.V. (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,766

(22) Filed: May 1, 1998

Related U.S. Application Data

(60) Provisional application No. 60/046,320, filed on May 13, 1997.

(51) Int. Cl.[7] .................................................. A23L 1/10
(52) U.S. Cl. ........................ 426/482; 426/599; 426/635; 426/807
(58) Field of Search .................................. 426/599, 589, 426/482, 481, 478, 590, 635, 807; 99/484, 495, 510, 511, 513

(56) References Cited

U.S. PATENT DOCUMENTS

| | | | |
|---|---|---|---|
| 2,016,584 | * | 10/1935 | Ash et al. ............................ 426/599 |
| 2,320,036 | * | 5/1943 | Harris ...................................... 426/51 |
| 2,548,510 | * | 4/1951 | Neal ...................................... 426/616 |
| 2,696,440 | * | 12/1954 | Ball ...................................... 426/599 |
| 2,982,657 | * | 5/1961 | Keitel ...................................... 426/51 |
| 3,083,104 | * | 3/1963 | Celmer ................................... 426/50 |
| 3,420,676 | * | 1/1969 | Keitel ...................................... 426/51 |
| 3,454,406 | * | 7/1969 | Alderton ............................... 426/325 |
| 3,787,589 | * | 1/1974 | Stephens et al. ..................... 426/325 |
| 4,039,348 | * | 8/1977 | Hunwick ................................. 127/9 |
| 4,857,343 | * | 8/1989 | Hekel ................................... 426/239 |
| 4,931,297 | * | 6/1990 | Malyniak et al. .................... 426/254 |
| 5,090,306 | * | 2/1992 | Gresch ................................... 99/510 |
| 5,403,613 | * | 4/1995 | Furui et al. .......................... 426/599 |
| 6,151,799 | | 11/2000 | Jones ...................................... 34/378 |

FOREIGN PATENT DOCUMENTS

2020544 A * 11/1979 (GB) .

OTHER PUBLICATIONS

Philip Nelson, Ph.D., "Fruit & Vegetable Juice Processing Technology", Avi Pub., 241–248, 532–533, Jul. 1980.*

Fuks et al., "Fruit Juice Extracting Press", Patent SU986921 A, Derwent Abstract, Jan. 1983.*

* cited by examiner

Primary Examiner—Nina Bhat
(74) Attorney, Agent, or Firm—Knobbe, Martens, Olson & Bear, LLP

(57) ABSTRACT

The invention includes a method of processing solid and pulp-like vegetable remnants obtained by steam peeling into two high value vegetable components, namely, vegetable juice and animal fodder. In one embodiment, the invention comprises feeding vegetable steam peelings into a tank, separating the vegetable remnants from the vegetable juice contained in the remnants to produce (1) solid vegetable remnants with a dry matter content of greater than approximately 15% suitable for use as directly administrable animal fodder having a greater value per kilogram than the original vegetable remnants and (2) extracted vegetable juice.

7 Claims, 2 Drawing Sheets

METHOD FOR THE EXTRACTION OF VEGETABLE JUICES FROM VEGETABLE RESIDUE AND/OR FROM VEGETABLE REMNANTS RESIDUE

This application claims priority to U.S. Provisional Application Ser. No. 60/046,320, filed May 13, 1997.

FIELD OF THE INVENTION

The invention relates to a method and an installation respectively for the extraction of vegetable juices from vegetable peelings, whether processed or not, or similar vegetable juices containing vegetable remnants.

BACKGROUND OF THE INVENTION

During industrial processing of vegetables into e.g. vegetable preserves, or frozen vegetables, such as is carried out with carrots and turnips, quite a lot of vegetable waste is produced after rinsing and peeling, in the form of vegetable peelings such as e.g. carrot and/or turnip peelings (usually called pulp), which are not considered to be useful for human consumption. Normally this vegetable waste is not only thrown away or used as fodder, but also the costs of removing, resulting from environmental legislation, this rapidly fermenting vegetable pulp, are relatively high. Analysis of those remnants shows that this vegetable waste/fodder still contains a considerable quantity of extractable vegetable juices which would otherwise be suitable for human consumption. Research however shows that the dry matter content of said pulp is not higher than approx. 10%, which means that the remaining 90% consists of moisture. The invention relates to a method and an installation respectively for extracting a vegetable juice from these aforementioned vegetable peelings (pulp), yet suitable for human consumption.

It is clear that if e.g. 20,000 tons of pulp, obtained by (steam)peeling of e.g. carrots or from other similar products (turnip, cabbage), are annually processed, a considerable quantity of carrot juices and/or other vegetable juices respectively, may yet be obtained which up to now are disposed of and thus wasted.

SUMMARY OF THE INVENTION

According to the invention, however and most surprisingly, it turned out yet to be possible by overextracting to obtain a juice most suitable for human consumption from those carrot (steam)peelings. The extraction takes place by separating the juice from the vegetable residue by means of squeezing and/or decantation and/or centrifugation and/or similar separation techniques, known per se. By appropriate adjustment of a separator a surprisingly high percentage of vegetable juice, amazingly well suitable for human consumption, can so be extracted from the pulp. The remainder is a residual product with a remarkably and surprisingly high dry matter content, which is now most suitable and useful as fodder.

According to the invention, the method for extracting vegetable juices, particularly from vegetable peelings, whether pretreated or not, or similar vegetable juice containing vegetable remnants (pulp), with a relatively low dry matter content and a high vegetable juice content, comprising the steps of:

a. grinding and/or shredding (if required) the vegetable remnants and/or separated vegetable pulp parts with a low dry matter content;

b. adding pH reducing additives to the vegetable pulp parts;

c. separating the juice from the residue, particularly the residue obtained by steam-peeling vegetables.

The separation can be effected by squeezing and/or decantation and/or centrifugation unit and/or similar separation techniques.

This will produce an exceptionally high juice yield, with high quality vegetable juices;

d. removal (if required) of sand elements and/or other impurities as residual components from the vegetable juice;

e. dosing one or more additives;

f. conditioning the obtained vegetable juice and/or the juice containing vegetable remnants, consisting of pasteurization and/or pH reduction;

g. bottling and/or deepfreezing and/or bulk packaging the vegetable juice obtained;

h. removing the residual product, with a relatively high dry matter content, which has been obtained during the separation stage.

Furthermore the invention relates to an installation for carrying out the method as described above. This installation comprises a combination of a number of consecutive processing stations, comprising:

a. if the coarseness of the residue supplied should make this advisable, first mechanical means for refining/reducing, e.g. by means of grinding and/or shredding the vegetable juice containing vegetable remnants or the vegetable pulp parts with low dry matter content;

b. second mechanical means, such as a metering pump, for a first addition of pH reducing additives;

c. third mechanical means for separating the juice from the residue (pulp) to extract the vegetable juices;

d. if the composition of the juice obtained should make this advisable fourth mechanical means for removing sand or other impurities as residual components from the vegetable juice;

e. fifth mechanical means for conditioning the squeezed out vegetable juice and/or the juice containing vegetable remnants, consisting of pasteurization and/or standardization of the pH in the juice and mechanical means for adding additives;

f. sixth mechanical means for bottling and/or deepfreezing and/or bulk packaging of the vegetable juice obtained;

g. seventh mechanical means for removing the dry residual product which has been obtained during the separation stage.

According to the invention, first mechanical means are constituted by a grinding and/or shredding unit known per se, to achieve a desired fineness.

According to the invention, second mechanical means comprise a device for the first addition of pH reducing additives to the vegetable residue. According to the invention, third mechanical means are provided for separating the vegetable juice from the vegetable residue by means of techniques known per se, such as squeezing and/or decantation and/or centrifugation and the like.

According to the invention, fourth mechanical means consist of means, known per se, to remove sand elements or other undesired residual components from the vegetable juice, e.g. by means of a sand and/or dirt cyclone.

According to the invention, fifth mechanical means are provided for the conditioning of the vegetable juice and/or the juice containing vegetable remnants which have been separated out, these means consisting of pasteurization and/or pH reduction and/or sixth mechanical means for the addition of other additives;

According to the invention, seventh mechanical means provided with the installation are used to bottle and/or deepfreeze and/or bulk package the vegetable juice obtained.

According to the invention, eighth mechanical means are provided for the removal of the residual product with a relatively high dry matter content, which is obtained during the separation stage.

BRIEF DESCRIPTION OF THE DRAWINGS

Below, the invention will be explained further by means of a drawing of an inventive embodiment.

DETAILED DESCRIPTION OF THE INVENTION

Figure 1:
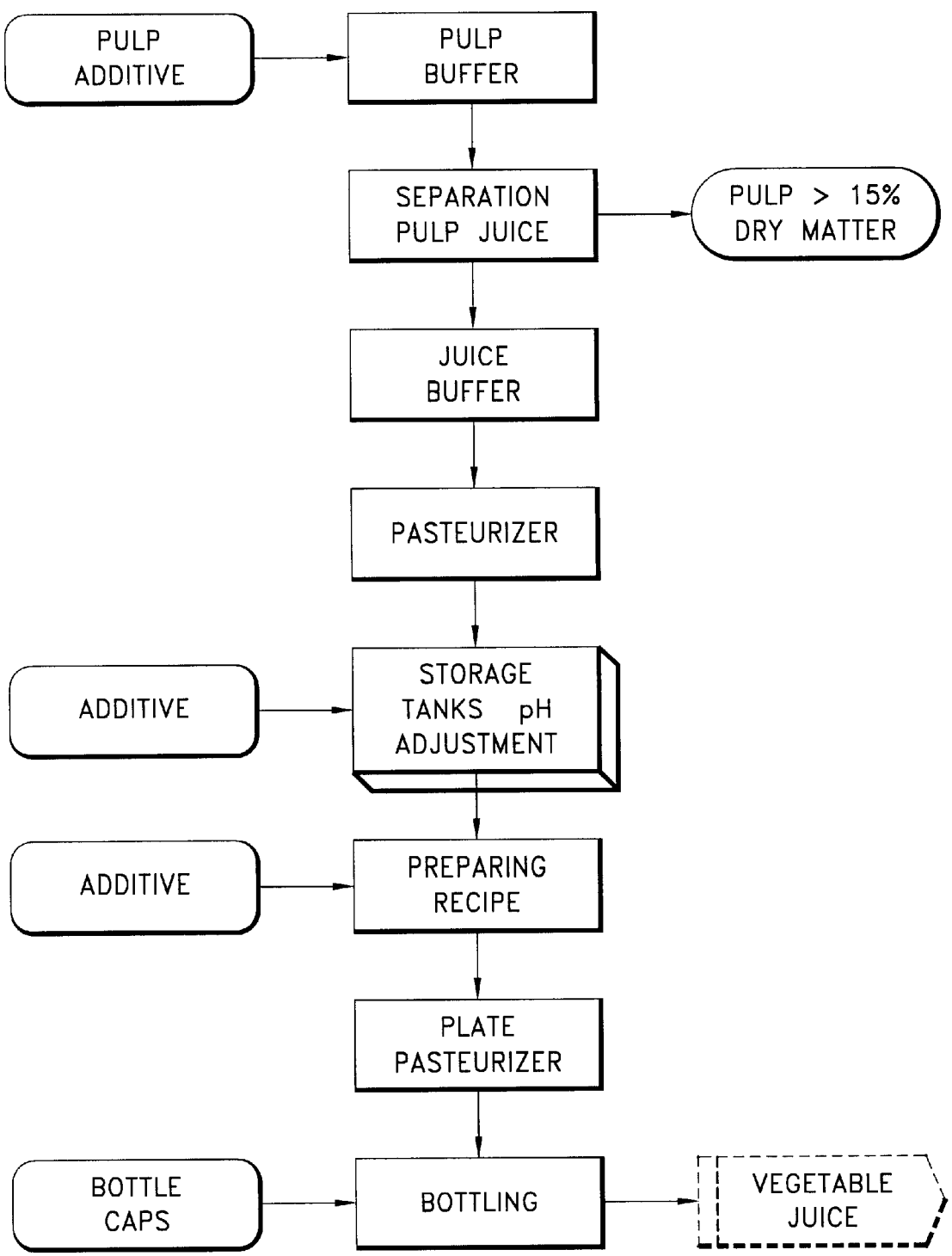
FIG. 1 shows in a block diagram several processing stages in the processing of carrot steam peelings, as an example of vegetable remnants, into a carrot juice suitable for human consumption.
Figure 2:
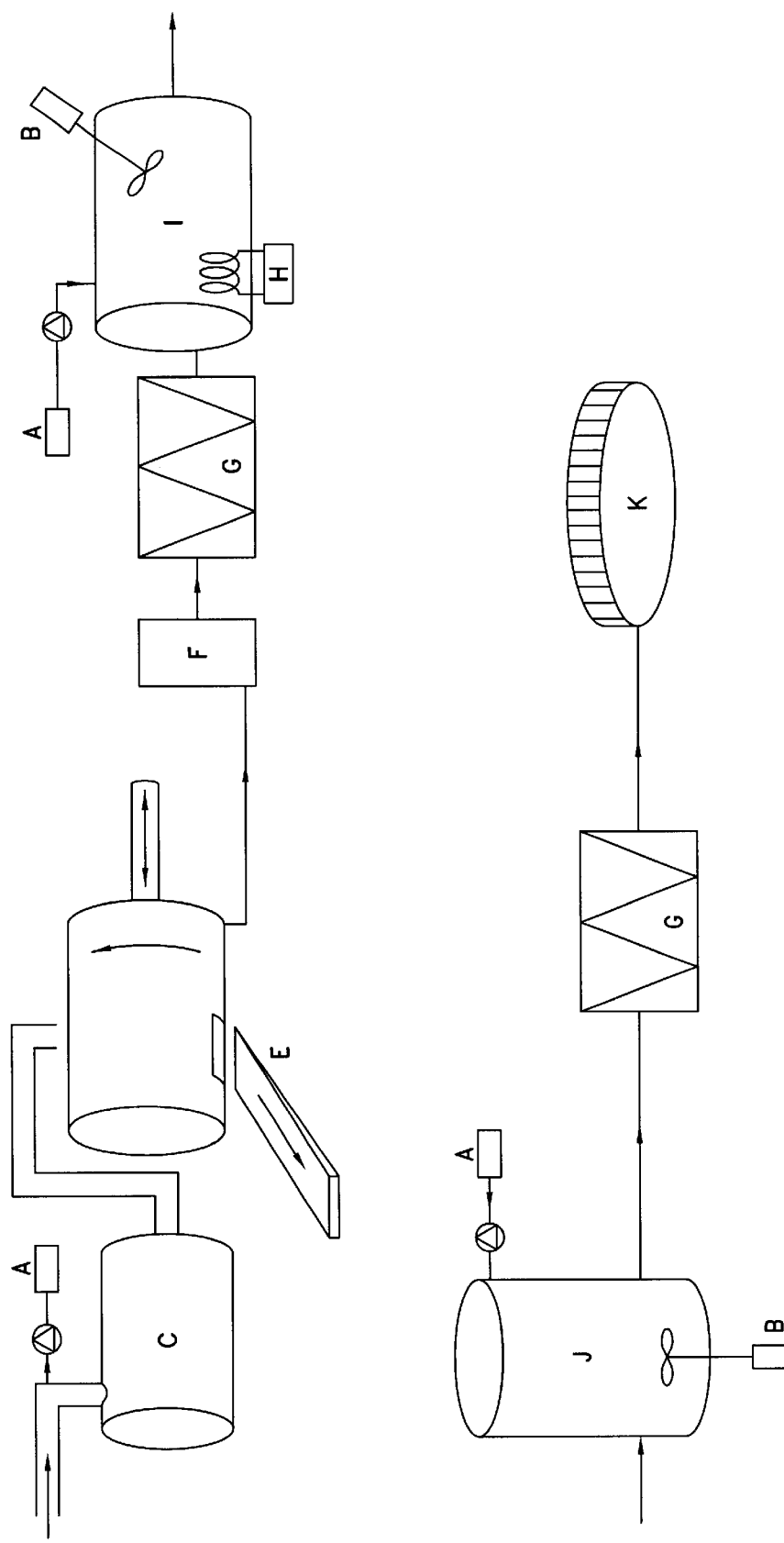
FIG. 2 shows a diagram of an installation according to the invention, indicating the separate processing stations.

FIG. 1 shows a diagram of the production process of a carrot juice from carrot remnants, and FIG. 2 shows a schematic of the apparatus to perform the process sequence of FIG 1. The carrot steam peelings are acidulated in pulp buffer tank 1 by means of an additive from dose measuring device 2, which prevents fermentation. In a separation unit the pulp is subsequently separated into vegetable juice and residual product having a dry matter content of approx. 15% or more. The residual product ends up in pulp container 4, while the vegetable juice obtained is collected in juice buffer tank 5, after sand elements and/or other impurities, if any, have been removed.

The vegetable juice is then fed through a plate pasteurizer, whereupon in storage tank 7 an acid solution is dosed from dose measuring device 8, which brings the pH of the carrot juice upon the desired value. To meet the desired taste need of the user, a sweetener and/or acid crystals and/or other additives may be added, if required, right before and/or right after the second plate pasteurizer 10, by means of dose measuring device 10 in preparation tank 9.

The vegetable juice can be bottled in bottling unit 12, and the bottles can be capsuled in capsuling unit 13. As desired the vegetable juice may also be deepfrozen and/or stored in bulk and/or bottled otherwise.

FIG. 2 shows a schematic set-up of a process installation for the production of carrot juice from carrot steam peelings, using the method according to the invention. Dose measuring device A adds a pH reducing additive to the carrot steam peelings, which may have been refined, in pulp buffer tank C. This mixture is then fed to pulp/juice separation unit D. This unit may consist of e.g. a squeezing and/or decantation and/or centrifugation and/or other separation unit. A dry pulp removal device E has been provided at the bottom of this separation unit. This method makes it possible to obtain from the residue a surprisingly high yield in carrot juice which is suitable for human consumption. Furthermore it turns out that the residual product, which is removed from the separator D has a relatively high dry matter content of approximately 15% or more, which makes it perfectly suitable to be sold to the fodder industry.

The carrot juice thus obtained, which is still slightly impure, now first passes dirt cyclone F. The purified carrot juice is then fed to first pasteurizer G. Thereupon, in the storage tank 1, additives from dose measuring device A are supplied to the carrot juice, mixed by stirring device B and cooled by heat exchanger H. It is then fed to mixing tank J, which is also equipped with a dose measuring device A and a stirring device B. After the carrot juice has thus been dosed with the required nutrient, flavoring and preservatives, it passes through the second pasteurizer G. Subsequently it may be bottled and capsuled in bottling unit K.

It is noted that the purpose of the method and the installation is to provide a novel way to convert peelings and the like, which up to now are not used to extract therefrom vegetable juice, into vegetable juice suitable for human consumption.

However, the method and the installation according to the invention also make it possible to obtain a maximum yield in vegetable juice from entirely unpeeled vegetables, since in that case the favourable end result achieved is the same as is achieved according to the invention with e.g. steam peeling. For an expert, it goes without saying that an end result achieved in the same manner out of an entirely unpeeled vegetable may also be covered by this invention.

The processing stating that separates the vegetable juice from the vegetable residue may include a squeezing system, a straining band squeezing system, a decantation system or a centrifugation system. It is contemplated that these system may also be combined with each other.

The squeezing system selected for the implementation of the method is already known as such for the squeezing of very juicy fruits. Never before has even the slightest idea been suggested to connect such a fruit squeezing system in any way with 'recovering' vegetable juice left in vegetable peelings, since the extent of that recoverability has always been deemed absolutely impossible, and the customary squeezing methods have always been considered sufficient. It is the merit of this invention that now for the first time a successful result has been obtained to realize those recoverable large quantities of vegetable juice from waste. Simultaneously such solidity is rendered to the remaining residue that it can be used as directly administrable fodder, all this without undue and inadmissible strains on the environment as a result of seasonal production. With regard to the special squeezing systems for this new purpose, a straining band squeezing system and/or a decantation system and/or a centrifugation system may be used as well. None of these systems have ever been deemed applicable for processing peelings or the like.

What is claimed is:

1. A method of processing solid and vegetable remnants obtained by steam peeling into two high value vegetable components, said method comprising:

feeding vegetable steam peeling remnants into a tank, the remnants having a dry matter content less than about 10%;

adding a first additive to the vegetable remnants to prevent fermentation;

separating the vegetable remnants from the vegetable juice contained in the remnants to produce (1) solid vegetable remnants with a dry matter content of greater than approximately 15% suitable for use as directly administrable animal fodder having a greater value per kilogram than the original vegetable remnants and (2) extracted vegetable juice; and rendering the extracted vegetable juice fit for human consumption by adding at least one second additive to the extracted vegetable juice and conditioning the extracted vegetable juice by one of pasteurization or pH reduction.

2. The method of claim 1, wherein the step of processing the prepared vegetable remnants includes processing in a fruit-squeezing system.

3. The method of claim 1, further comprising removing solid impurities from the extracted vegetable juice.

4. The method of claim 1, wherein the step of processing the prepared vegetable remnants includes at least one of squeezing, decantation, and centrifugation.

5. The method of claim 1, wherein the step of conditioning includes pH reduction.

6. The method of claim 1, further comprising at least one of grinding and shredding prior to adding the first additive.

7. The method of claim 1, wherein the extracted juice contains sand or other undesired residual components, and further comprising the step of filtering the juice to remove the sand and undesired residual components.

* * * * *